Dec. 23, 1969     C. W. MILES     3,485,325
PAD CLIP FOR DISK BRAKES
Filed March 28, 1968
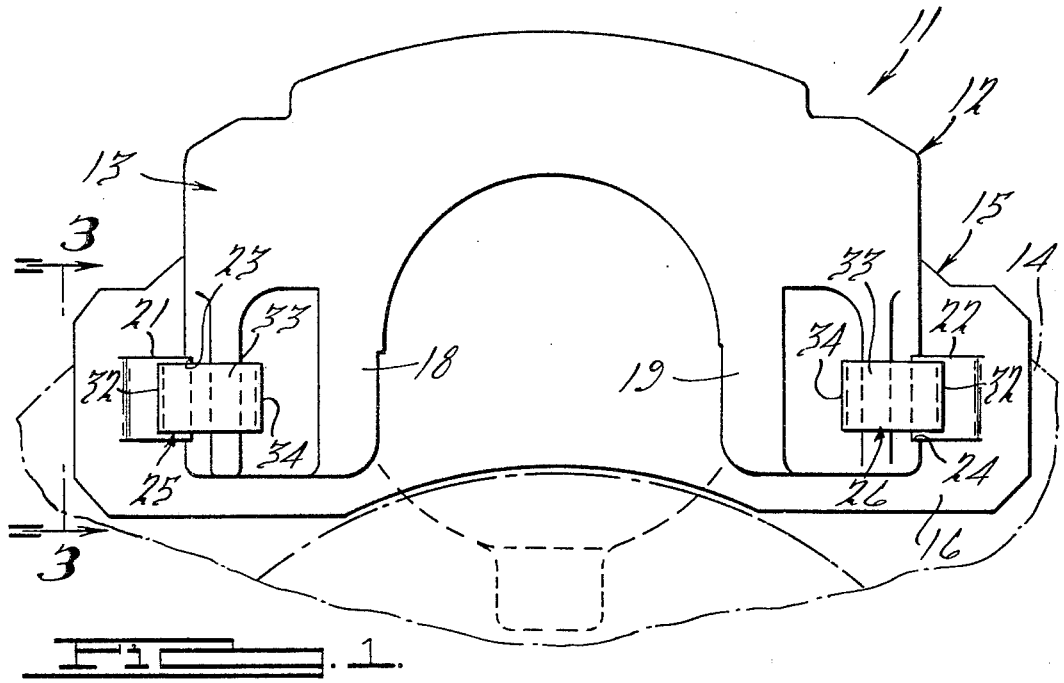
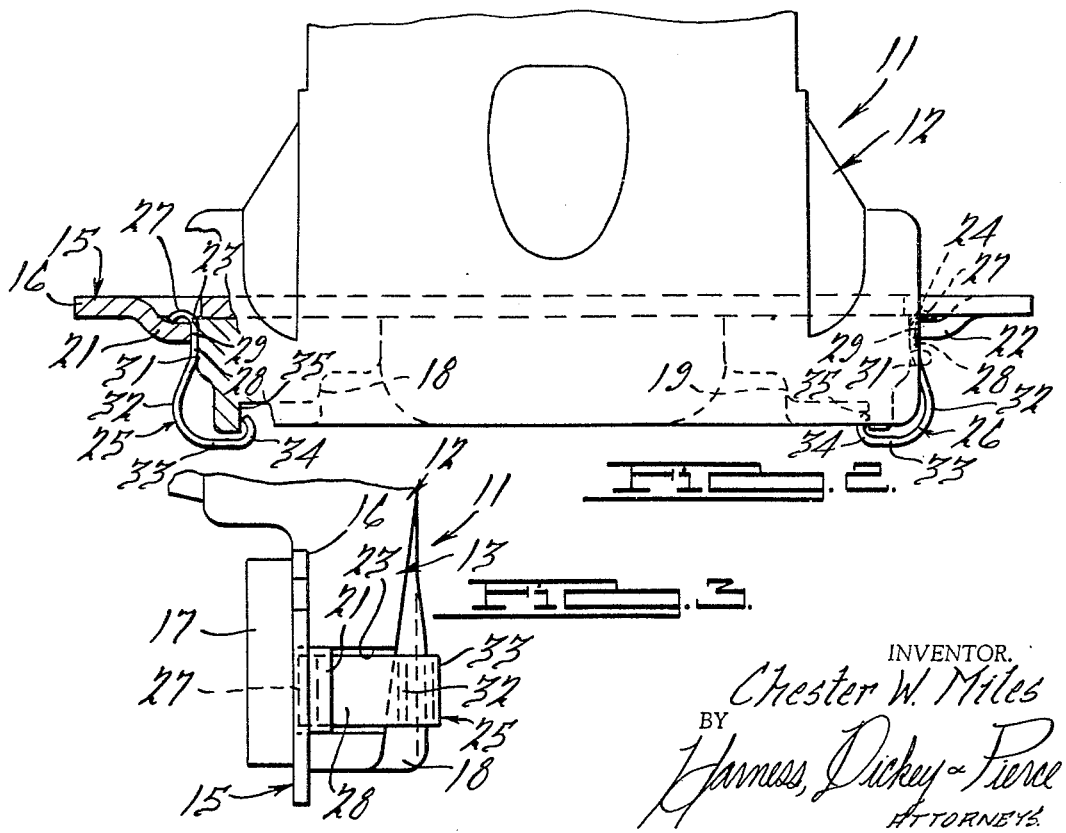
INVENTOR.
Chester W. Miles
BY
Harness, Dickey & Pierce
ATTORNEYS

United States Patent Office 3,485,325
Patented Dec. 23, 1969

1

3,485,325
PAD CLIP FOR DISK BRAKES
Chester W. Miles, Detroit, Mich., assignor to Kelsey-Hayes Company, a corporation of Delaware
Filed Mar. 28, 1968, Ser. No. 716,849
Int. Cl. F16d 55/224
U.S. Cl. 188—73                         2 Claims

ABSTRACT OF THE DISCLOSURE

An automotive disk brake assembly embodying a spring clip for affixing the brake pad to the caliper housing.

BACKGROUND OF THE INVENTION

This invention relates to disk brakes and more particularly to an improved pad clip for securing one of the brake pads to the associated caliper housing.

In one relatively widely used form of automotive type disk brake, the sliding caliper type, a caliper assembly straddles the associated brake disk and brake pads associated with legs of the caliper are disposed on each side of the disk. An actuating device is carried by one of the caliper legs for moving the associated brake pad into engagement with the disk and for exerting a reactive force that slides the caliper in a direction perpendicular to the axis of rotation of the disk for bringing the other brake pad into engagement with the disk. In this type of construction, a supporting arrangement must be used for fixing the second brake pad with respect to the reactive leg of the caliper. This connection should be such that the brake pad is adequately supported, but should also facilitate convenient and rapid replacement of the brake pad when its frictional lining is spent. In one method of so supporting the brake pad, its backing plate is formed with extensions or pins that extend through apertures in the reactive leg of the caliper. Fastening means such as nuts or spring clips are secured to the outer ends of these pins to hold the pad with respect to the reactive leg of the caliper. Such a construction is shown in U.S. Letters Patent 3,361,229, entitled "Caliper Type Disk Brakes," issued Jan. 2, 1968 in the name of Harvey C. Swift. This type of construction is relatively expensive and is somewhat cumbersome insofar as replacement is concerned.

It is, therefore, a principal object of this invention to provide an improved brake pad supporting arrangement for a disk brake.

It is another object of this invention to provide a spring clip for affixing a brake pad relative to the associated caliper leg.

SUMMARY OF THE INVENTION

This invention is particularly adapted to be embodied in a disk brake assembly having a caliper and a brake pad. The invention consists of spring clip means engaging the brake pad and the caliper for affixing the brake pad to the caliper.

BRIEF DESCRIPTION OF THE DRAWINGS

FIGURE 1 is a side elevational view of a portion of a disk brake assembly embodying this invention.

FIGURE 2 is a partial top plan view, with portions broken away, of the disk brake assembly shown in FIGURE 1.

FIGURE 3 is a side elevational view taken generally in the direction of the line 3—3 in FIGURE 1.

DETAILED DESCRIPTION OF THE PREFERRED EMBODIMENT

The invention is disclosed in combination with a disk brake assembly of the sliding caliper type, identified generally by the reference numeral 11. The brake assembly 11 includes a caliper, indicated generally by the reference numeral 12, having a pair of spaced leg portions, only one of which is shown and which leg is identified generally by the reference numeral 13, that straddle opposite sides of an associated brake disk 14. The leg of the caliper 12 that is not shown carries a fluid motor and associated brake pad that is adapted to be brought into frictional engagement with the associated side of the disk 14 in any known manner. In addition, the caliper 12 is supported for sliding movement in a direction parallel to the axis of rotation of the disk 14 so that the leg 13 acts as a reaction leg to bring its associated brake pad, indicated generally by the reference numeral 15, into frictional engagement with the associated side of the disk 14. The sliding support for the caliper 12 also is such that the brake assembly 11 is held against rotation when the brake pads engage the disk 14. This portion of the construction forms no part of the invention and has not been described for that reason. Reference may be had to the aforenoted patent of Harvey C. Swift for a suitable construction that may be used in conjunction with this invention.

The specific description of a preferred embodiment of this invention, which relates to the manner in which the brake pad 15 is supported by the caliper leg 13, follows. The brake pad 15 consists of a sheet metal backing plate 16 to which a frictional lining 17 is affixed in any known manner. The backing plate 16 extends laterally beyond bifurcated leg parts 18 and 19 of the caliper reactive leg 13. The laterally extending portion of the backing plate 16 is formed with struck out tabs 21 and 22 that extend in part into complementary recesses 23 and 24 formed in the caliper leg parts 18 and 19.

Spring clip assemblies, indicated generally by the reference numerals 25 and 26, coact with the backing plate tabs 21 and 22 and caliper leg parts 18 and 19 to affix the brake pad 15 with respect to the caliper reactive leg 13. The spring clips 25 and 26 are formed from sheet steel, such as SAE 1074 steel, that is hardened and tempered to have the desired spring like characteristics. Each of the clips 25 and 26 is formed with a reversely bent end portion 27 that engages the respective backing plate tab 21 or 22 on the side adjacent the disk 14. An intermediate section 28 of each of the clips 25 and 26 extends between an inwardly facing shoulder 29 formed by the respective tab 21 or 22 and an oppositely facing shoulder 31 of the respective caliper leg part 18 or 19. From the intermediate portion 28 the spring clips 25 and 26 curve outwardly, as at 32, and have a part 33 that extends substantially parallel to the outer face of the caliper leg parts 18 and 19. The spring part 33 terminates in a reversely bent end portion 34 that engages an inwardly facing shoulder 35 formed by the respective caliper leg part 18 or 19.

The configuration of the spring clips 25 and 26 is such that the parts 32 and 33 are under some tension so that the engagement of the end parts 27 and 34 with the backing plate tabs 21 or 22 and the caliper shoulders 35 affix the brake pad 15 with respect to the caliper leg 13. In addition, any frictional torque exerted upon the brake pad 15 through the engagement of its lining 17 with the disk 14 will be resisted by the engagement of the tab shoulders 29 with the clip portions 28 and, accordingly, with the shoulders 31 of the caliper leg 13. Thus, frictional torque will be transmitted from the brake pad 15 through the spring clips 25 and 26 to the caliper leg 13. If it is desired to replace the friction pad 15, the spring clips 25 and 26 may be conveniently removed by inserting a prying tool between the rear face of the caliper leg 13 and the portions 33 of the spring clips. The reversely bent end portions 34 may then be slid beyond the shoulders 35 so that the pad 15 may be removed in a downward direction. The clips 25 and 26 may be reused to affix the new brake pad to the caliper 12.

While it will be apparent that the preferred embodiment of the invention disclosed is well calculated to fulfill the objects above stated, it will be appreciated that the invention is susceptible to modification, variation and change.

What is claimed is:

1. In a disk brake assembly having a caliper with a reactive leg portion disposed on one side of an associated brake disk and a brake pad, the brake pad having a frictional lining and a backing plate, the improvement comprising spring clip means engaging said backing plate and said reactive leg portion of said caliper for affixing said brake pad to said caliper, said reactive leg portion being formed with a recess, offset tab means formed in said backing plate and defining an opening therein, said spring clip means having one end engaging said tab means and means extending through said opening in said backing plate and across said recess in said caliper leg portion, said tab means defining a shoulder in engagement with the portion of the spring clip means in engagement with said caliper recess for transmitting frictional torque from said brake pad to said caliper through said spring clip means.

2. A disk brake assembly as set forth in claim 1 wherein the spring clip has a first reversely bent end portion in engagement with the tab means of the backing plate and a second reversely bent end portion in engagement with a shoulder formed by the caliper.

References Cited

UNITED STATES PATENTS

| 2,973,837 | 3/1961 | Wilson | 188—73 |
| 3,150,745 | 9/1964 | Eksergian | 188—73 |
| 3,387,687 | 6/1968 | Eggstein et al. | 188—73 |

FOREIGN PATENTS

| 994,827 | 6/1965 | Great Britain. |

GEORGE E. A. HALVOSA, Primary Examiner

U.S. Cl. X.R.

188—205